(No Model.)

J. W. GRAY.
PNEUMATIC TIRE FOR BICYCLES.

No. 467,502. Patented Jan. 26, 1892.

Witnesses
H. A. Giddings
G. B. Jenkins

Inventor
John W. Gray.
By Chas. L. Burdett
Atty.

UNITED STATES PATENT OFFICE.

JOHN W. GRAY, OF HARTFORD, CONNECTICUT, ASSIGNOR TO THE HARTFORD RUBBER WORKS COMPANY, OF CONNECTICUT.

PNEUMATIC TIRE FOR BICYCLES.

SPECIFICATION forming part of Letters Patent No. 467,502, dated January 26, 1892.

Application filed September 19 1891. Serial No. 406,171. (No model.)

*To all whom it may concern:*

Be it known that I, JOHN W. GRAY, of Hartford, in the county of Hartford and State of Connecticut, have invented certain new and useful Improvements in Pneumatic Tires for Bicycles, of which the following is a full, clear, and exact description, whereby any one skilled in the art can make and use the same.

My invention relates to the class of tires that are particularly adapted for use on velocipedes, bicycles, and like vehicles and are inflated when in proper condition for use.

The object of my invention is to produce a tire of this class that is so constructed as to automatically close or seal up all porous parts, whether due to accident, wear, or age; and to this end my invention consists of a hollow tire having an interior wall of the tire provided with a layer of viscid rubber; and it further consists in details of the several parts making up the tire as a whole, and in their combination, as more particularly hereinafter described, and pointed out in the claims.

Figure 1:
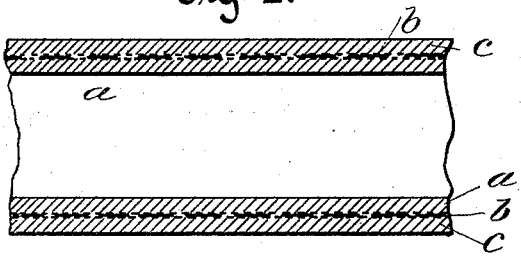
Figure 2:
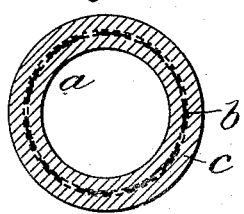

Referring to the drawings, Figure 1 is a detail view in lengthwise section of a tire embodying my invention. Fig. 2 is a detail view in cross-section through such a tire.

In the class of pneumatic tires known to the art prior to my invention specimens have been made composed of alternate layers of india-rubber and of textile material, and one of the most serious faults in all of such tires is the liability to puncture and after puncture having the air more or less exhausted by leakage from the tube, and thus causing the tire to collapse and become unfit for use. In order to prevent this leaking of air and collapsing of the tube, a tire made in accordance with my invention is provided with an interior layer of viscid or viscous rubber or like gum that is embedded in the interior of the wall of the tire, preferably in the manner and by the means as herein described.

In the practice of my invention a tube *a* of any desired size is produced, either by a tubing-machine or by calendering a sheet of rubber and then rolling it up into the tubular form in any well-known manner. The sealing-layer *b* is preferably made by covering a sheet of flexible material such as is known as "canvas" or the like with layers of rubber on one or both sides and more or less incorporated with the textile material by uniting the canvas and rubber by the use of calender-rolls. This rubber is preferably non-vulcanizable—that is, it is of such consistency that it will not vulcanize by exposure or subjection to heat to a degree sufficient to vulcanize thoroughly the inside layer and also the outside of the tire. It is preferred that rubber that will not vulcanize should be used; but a grade of rubber or compound that would ultimately vulcanize may be used, provided it will not be vulcanized by a degree of heat except as would destroy or render practically useless the two other layers—that is, the outer and inner layers—of the tire. This interior or sealing layer *b* is preferably united with the canvas, as the latter is used in order to give the tire a suitable degree of tensile strength to resist a bursting strain when the tire is expanded by air or meets shocks in use. The sealing-layer, including the canvas that preferably immediately supports it, is wound upon the inner layer in any desirable manner, and when a sufficient thickness of such sealing-layer has been formed it is covered with an outer layer *c* of vulcanizable rubber, as by rolling it on, or by any other suitable means. A tube thus composed of an inner vulcanizable layer and an outer vulcanizable layer and an interior layer of viscid or non-vulcanizable rubber is cut to the proper length, united at the ends, and vulcanized in the ordinary manner. As before stated, the interior sealing-layer remains viscid when the outer and inner layers have become vulcanized sufficiently to endure the wear and strains to which they will be subjected. It is not entirely essential to my invention that this viscid layer should extend completely around in the interior of the wall of the tube; but it should extend to a sufficient distance to protect that part of the tire which projects beyond the felly and is liable to puncture or like injury in use.

This pneumatic tire is of course provided with any suitable form of valve for the purpose of inflating the tire when it is in place on the rim of the wheel.

I claim as my invention—

1. A tubular tire for bicyles and like vehicles, made of india-rubber or like gum and having outer and inner surfaces of vulcanized rubber and within the wall of the tube an interior layer of viscid material, all substantially as described.

2. As an improved article of manufacture, a pneumatic tire for bicycles and like vehicles, composed of an outer and an inner layer of vulcanized rubber and within the wall of the tube forming the tire an interior layer of viscid rubber intimately united with canvas or like textile fabric, all substantially as described.

JOHN W. GRAY.

Witnesses:
CHAS. L. BURDETT,
A. B. JENKINS.